May 26, 1953          A. E. PALUCK          2,639,815
TOOL RACK
Filed July 22, 1949          2 Sheets-Sheet 1
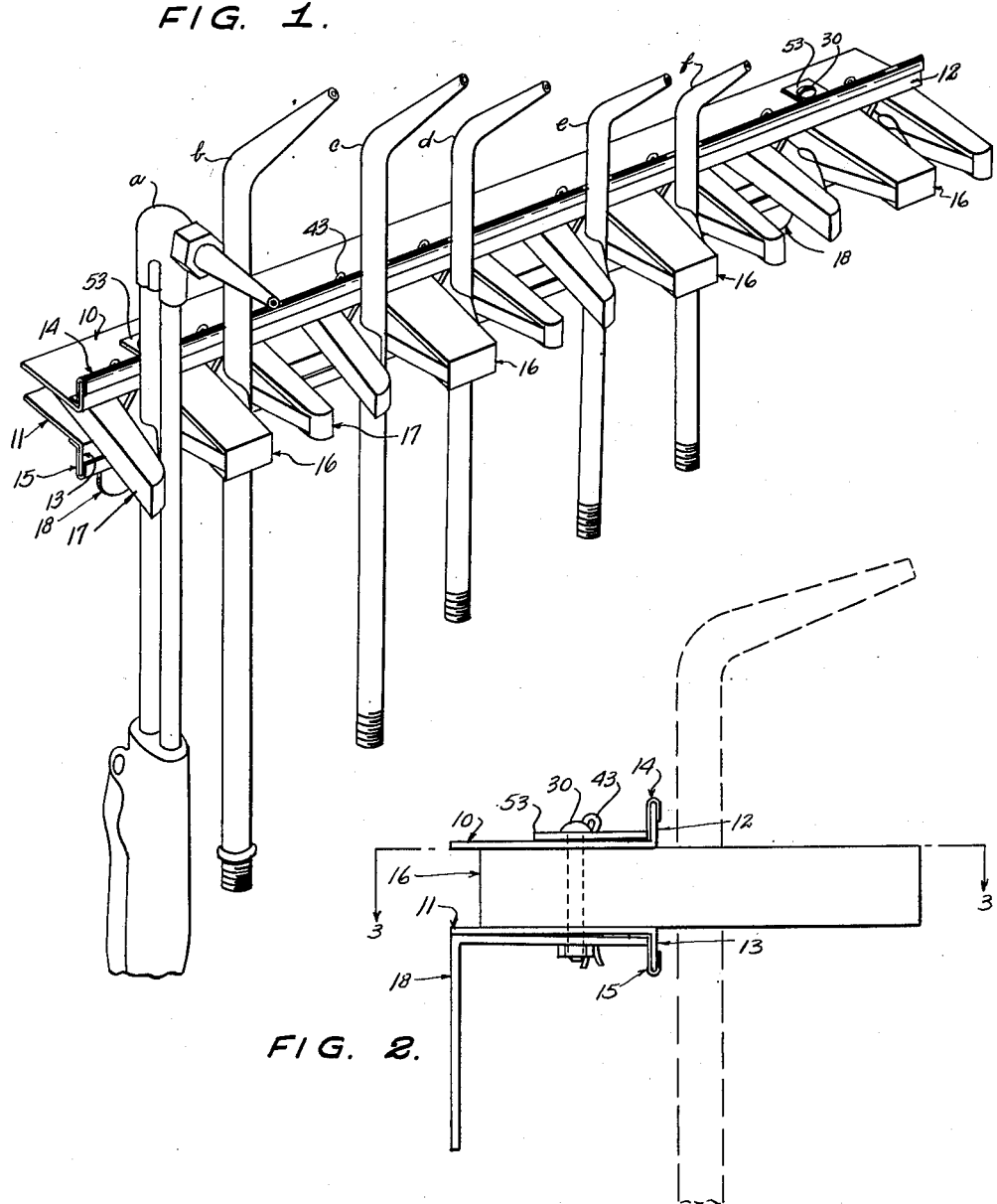
INVENTOR.
ALEXANDER E. PALUCK,
BY
McMorrow, Berman + Davidson
ATTORNEYS.

May 26, 1953  A. E. PALUCK  2,639,815
TOOL RACK
Filed July 22, 1949  2 Sheets-Sheet 2
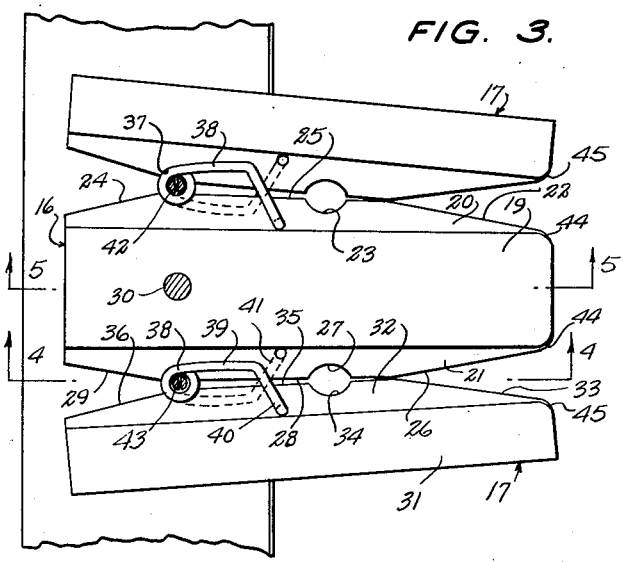
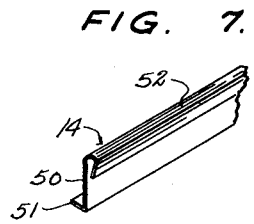
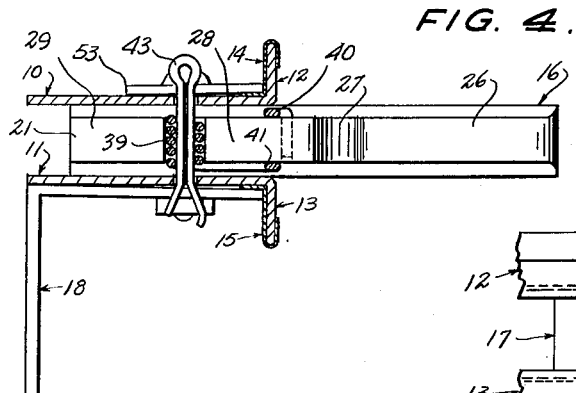
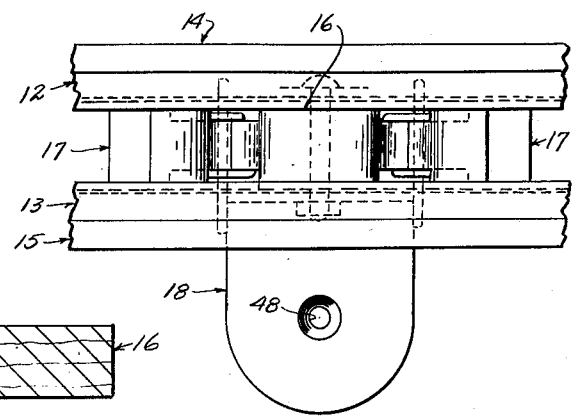
INVENTOR.
ALEXANDER E. PALUCK,
BY
McMorrow, Berman + Davidson
ATTORNEYS.

Patented May 26, 1953

2,639,815

UNITED STATES PATENT OFFICE 2,639,815

TOOL RACK

Alexander E. Paluck, Belfield, N. Dak.

Application July 22, 1949, Serial No. 106,291

2 Claims. (Cl. 211—60)

This invention relates to tool racks or supports, and more particularly to a well-mounted rack for supporting tools or elongated objects, such as welding or cutting torch nozzles.

It is among the objects of the invention to provide an improved rack or tool support which can be easily and conveniently mounted on a wall or other vertical support, at a convenient height, and will readily receive and firmly support a plurality of tools or elongated objects, such as welding torch nozzles, in a manner such that any selected object can be quickly and easily removed without disturbing any of the remaining objects, which will support elongated, tubular objects, such as welding torch nozzles, in a substantially vertical position, so that dust or other foreign material will not accumulate therein, and which will not mar or damage the objects as they are placed in or removed from the rack, which resiliently grips the objects so that they are firmly supported against displacement by vibration or other disturbing effects and effectively guides the objects to their supported positions, so that the objects can be quickly placed in the rack, which provides an effective lever fulcrum for quickly and easily removing the objects from the rack, and which is simple and durable in construction, economical to manufacture, and neat and attractive in appearance.

Other objects and advantages will become apparent from a consideration of the following description and the appended claims in conjunction with the accompanying drawings, wherein:

Figure 1 is a perspective view of a tool-supporting rack illustrative of the invention showing a plurality of tools or equivalent objects operatively supported therein;

Figure 2 is an end view of the rack illustrated in Figure 1;

Figure 3 is a longitudinal cross-section of a fragmentary portion of the rack taken substantially on the line 3—3 of Figure 2;

Figure 4 is a transverse cross-section on the line 4—4 of Figure 3;

Figure 5 is a transverse cross-section on the line 5—5 of Figure 3;

Figure 6 is a front elevation of the fragmentary portion of the rack illustrated in Figure 3; and Figure 7 is a perspective view of a fragmentary portion of a rail or beading providing a tool-removing fulcrum for the rack.

With continued reference to the drawings, the rack comprises, in general, a pair of elongated, flat plates 10 and 11, of substantially rectangular shape and disposed in spaced-apart, substantially parallel relationship, a substantially perpendicularly-disposed flange 12 along one longitudinal edge of the plate 10, a simiar flange 13 along one longitudinal side of the plate 11, rails 14 and 15 on the flanges 12 and 13, respectively, a plurality of center jaws 16 disposed between the plates 10 and 11 and spaced apart at substantially equal intervals longitudinally of the plates with portions projecting from the plates at the flange sides of the latter substantially perpendicular to the flanges, side jaws 17 respectively disposed at each side of each of the center jaws 16, and angle brackets 18 secured to one of the plates at spaced-apart locations longitudinally of such plate for attaching the rack to a vertical supporting surface, such as a building wall.

The plates 10 and 11 are elongated strips of suitable, thin-walled metal, such as steel, and may be provided in lengths to receive the desired number of tool-supporting jaws. The rails or beading 14 and 15 are preferably formed of a comparatively soft sheet metal, such as copper or aluminum, so that contact of the steel tools or nozzles with these rails will not mar or scratch the nozzles.

The center jaws 16 are preferably formed of a rigid material somewhat softer than the steel of which the tools or nozzles are made, a hard wood, such as maple or oak having been found particularly suitable for this purpose. Each of the center jaws 16 is a unitary body comprising an elongated, intermediate portion 19, of rectangular, cross-sectional shape, and two lateral extensions or ribs 20 and 21 disposed at respectively opposite sides of the intermediate portion 19 and extending for the entire length of such portion. The two ribs 20 and 21 have a thickness materially less than the thickness of the intermediate portion 19 and are equally spaced from the top and bottom of the intermediate portion 19. The rib 20 has an outer end portion which is tapered toward and as far as the outer end of the jaw, the tapered portion extending for a distance approximately one-third of the length of the jaw, and near the wider inner end of this end portion the rib 20 is provided with a partly cylindrical recess 23. The outer surface of the rib 20 extends from the recess away from the sloping surface 22 substantially parallel to the adjacent side of the intermediate portion 19 for a distance substantially one-half the distance between the recess 23 and the normally inner end of the rib, and another inclined surface 24 extends from the inner end of the jaw to the adjacent end of a surface 25 which is substantially parallel to the adjacent side of the center portion 19. The rib 21 has an inclined surface 26, extending rearwardly or inwardly from the front or outer end of the jaw, a recess 27, an outer surface 28 parallel to the adjacent side of the intermediate portion 19, and a rear inclined surface 29, which surfaces and recess are similar in all respects to the surfaces 22, 25 and 24, and the recess 23 of the rib 20, except that the rib 21 is disposed at the opposite side of the center portion from the rib 20, and the inclined surfaces 26 and 29 are oppositely inclined to the surfaces 22 and 24.

The two plates 10 and 11 are provided with apertures so arranged that each aperture in one plate registers with a corresponding aperture in the other plate, and a screw fastener 30, which may be a conventional small bolt, extends through each center jaw 16 and through the plates 10 and 11 at the opposite sides of the jaws to rigidly secure the center jaws and the plates 10 and 11 together in operative assembly.

Each side jaw 17 has a shape corresponding to one-half of a center jaw 16 when such center jaw is divided along its longitudinal center line by a plane parallel to the sides of the intermediate portion 19 from which the ribs 20 and 21 extend. Thus, each side jaw has a plane elongated outer side 31, and a rib 32 extends along the opposite side of the jaw 17, the rib 32 having a thickness materially less than the thickness of the jaw 17 and being equally spaced from the top and bottom of the jaw 17. The rib 32 of the side jaw has an outer end portion tapering to the outer end of the jaw 17 and has an inclined surface 33 of a length and inclination substantially the same as the inclined surfaces 22 and 26 of the center jaw 16, and has, adjacent the inner end of this inclined surface 33, a partly-cylindrical recess 34 which, when the side jaw is operatively associated with a center jaw, is complementary to the recess in the tongue of the center jaw to provide a rounded, tool-receiving opening between the side jaw and the center jaw. At the side of the recess 34 opposite the inclined surface 33 the tongue 32 of the side jaw has a surface 35 which extends substantially parallel to the opposite portion 31 to a location substantially mid-way between the recess 34 and the normally inner end of the side jaw. An inclined surface 36 extends from the normally inner end of the side jaw to the adjacent end of the surface 35.

The ribs of each center jaw and of each side jaw are provided at the rearward or inward ends of their surfaces 28 and 35 with partly cylindrical recesses which receive helical springs, as indicated at 38 and 39. The springs 38 and 39 are of the type employed in spring-equipped clothespins and each spring has two outwardly-projecting ends, as indicated at 40 and 41 in the case of the spring 39, one of these ends, for example, the end 40 being engaged in the outer or side jaw 17, and the other end, such as the end 41 being engaged in the center jaw 16. The spring ends are engaged in the side and center jaws, respectively, at locations between the spring coil-receiving opening and the tool-receiving opening provided between the two adjacent jaws, so that each spring will resiliently hold the associated side jaw against the corresponding center jaw.

Suitable fasteners, such as the cotter keys indicated at 42 and 43 in Figure 3, extend through the plates 10 and 11 and through the coils of the springs, respectively, to hold the springs in position between the associated center and side jaws.

At their normally outer ends the center jaws are rounded at their corners, as indicated at 44 in Figure 3, and the side jaws are correspondingly rounded at the corners adjacent the center jaws, as indicated at 45.

The two angle brackets 18 are secured to the plate-and-jaw assembly of the rack by two of the bolts 30 which secure the plates and corresponding center jaws 16 together, this arrangement being particularly illustrated in Figure 5. Each angle bracket has one leg 46 underlying the outer surface of the lower plate 11 and apertured to receive the corresponding bolt 30, and has its other leg 47 disposed perpendicular to the side edge of the plate 11 opposite the edge on which the flange 13 is provided. The leg 47 is provided with a suitable aperture 48 to receive a fastener, such as a wood screw, for attaching the rack to a wall or other vertical support.

The jaws are made up in units wherein each unit includes one center jaw and two side jaws disposed at respectively-opposite sides of the center jaw, each unit being capable of holding two elongated objects. As many such units as may be desired may be provided between a common pair of flanged plates, so that the capacity of the rack can be made to conform to shop requirements within the limits of manufacturing, transportation and mounting convenience. It is contemplated that the longest rack would not include more than four or five units and that, if additional capacity is required, additional racks would be installed.

The beadings or rails 14 and 15 each comprises a web portion 50 overlying the proximal side of the corresponding flange 12 or 13, as particularly illustrated in Figure 7 in the rail 14, a flange 51 disposed substantially at right angles to the web 50 along one edge thereof and overlying the outer surface of the corresponding plate 10 or 11 adjacent the flange, and a rolled portion 52 enclosing the outer edge of the flange. Apertured lugs 53 are secured against the outer surface of the plate 10 by the bolts 30 and bear at their ends upon the flange 51 of the rail or beading 14 to hold the beading firmly in place on the flange 12, and the legs 46 of the brackets 18 overlie, at their ends, the corresponding flange of the beading 15 to hold this beading firmly in place on the flange 13 of the plate 11.

In inserting an object, such as a welding torch nozzle into the rack, the nozzle is presented at a location intermediate its length to the outer end of the rack and between the outer inclined surfaces of a center jaw and an adjacent side or outer jaw, and is forced between these inclined surfaces toward the plate flanges. Movement of the nozzle between the outer inclined surfaces of the jaws forces the side jaw away from the center jaw against the force of the corresponding spring until the nozzle passes into the tool-receiving opening provided by the complementary recesses in the two adjacent jaws at which time the associated spring resiliently forces the outer jaw toward the center jaw resiliently clamping the nozzle between such outer and center jaw. The rack is preferably disposed in substantially horizontal position on a vertical supporting surface and, to remove a nozzle from the rack, the nozzle is grasped at a location below the rack and pulled outwardly. This swings the portion of the nozzle above the rack into contact with the upper rail or beading 14 which then provides a lever fulcrum, so that the force applied to the nozzle below the rack will pull the nozzle out of the tool-receiving opening between the two jaws and into the space between the inclined outer surfaces of the tongues of the two adjacent jaws, whereupon the nozzle is easily removed from the rack.

If the nozzle were grasped above the rack, the lower beading or rail 15 would then provide the lever fulcrum for dislodging the nozzle from the tool-receiving opening between the adjacent jaw tongues.

The complementary recesses providing the tool-receiving openings are so shaped that the jaw tongues at the location of these recesses closely embrace the nozzles to securely hold the nozzles against being dislodged by vibration and other disturbances, and the jaws, being made of a relatively soft material, such as wood, will not injure or mar the nozzles in any way. As the outer ends of the jaws are blunt and have rounded corners, it is not possible for a workman to either damage a nozzle or injure himself in inserting nozzles into the rack or removing them therefrom. Also, as the side jaws have a relatively large freedom of movement relative to the associated center jaws, the rack will support nozzles of various shapes and sizes, as indicated by the letters $a$ to $f$ inclusive in Figure 1.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a tool rack, a pair of plates in coextensive spaced parallel relation, a fixed jaw having an inner end portion positioned between and fixed to the plates and an outer end portion projecting outwardly from the plates, and a movable jaw positioned at and extending along a side of said fixed jaw, said movable jaw having an inner end portion positioned between and pivoted to said plates to enable the outer end portion of the movable jaw to be swung toward and away from the outer end portion of the fixed jaw, the facing sides of the jaws being formed with tool-gripping means said plates having outer edges positioned inwardly of the outer end portions of the jaws, and a flange extending along the outer edge of at least one of said plates and projecting laterally from the plane of the plate against which a tool is adapted to be fulcrumed to pry the movable jaw away from the fixed jaw to permit removal of the tool from between the jaws.

2. In a tool rack, a pair of plates in coextensive spaced parallel relation, a fixed jaw having an inner end portion positioned between and fixed to the plates and an outer end portion projecting outwardly from the plates, and a movable jaw positioned at and extending along a side of said fixed jaw, said movable jaw having an inner end portion positioned between and pivoted to said plates to enable the outer end portion of the movable jaw to be swung toward and away from the outer end portion of the fixed jaw, and spring means positioned between the fixed and movable jaws and urging the outer end portion of the movable jaw toward the outer end portion of the fixed jaw, the facing sides of the jaws being formed with tool-gripping means, said plates having outer edges positioned inwardly of the outer end portions of the jaws, and a flange extending along the outer edge of at least one of said plates and projecting laterally from the plane of the plate against which a tool is adapted to be fulcrumed to pry the movable jaw away from the fixed jaw against the resistance of said spring means to permit removal of the tool from between the jaws.

ALEXANDER E. PALUCK.

References Cited in the file of this patent

UNITED STATES PATENTS

| Number | Name | Date |
|---|---|---|
| 66,367 | Mason | July 2, 1867 |
| 303,218 | Evans | Aug. 5, 1884 |
| 620,260 | Thorpe | Feb. 28, 1898 |
| 969,520 | Buckingham | Sept. 6, 1910 |
| 1,081,852 | Mierzwik | Dec. 16, 1913 |
| 1,192,851 | Brorby | Aug. 1, 1916 |
| 1,852,391 | Ault | Apr. 5, 1932 |
| 1,874,871 | Bower | Aug. 30, 1932 |
| 1,992,356 | Dary | Feb. 26, 1935 |
| 2,469,481 | Snyder | May 10, 1949 |
| 2,479,356 | Hennes | Aug. 16, 1949 |
| 2,483,303 | Rysick | Sept. 27, 1949 |

FOREIGN PATENTS

| Number | Country | Date |
|---|---|---|
| 579,356 | Great Britain | July 31, 1946 |